J. L. CREVELING.
ELECTRIC SYSTEM.
APPLICATION FILED SEPT. 21, 1916.
1,361,448.
Patented Dec. 7, 1920.
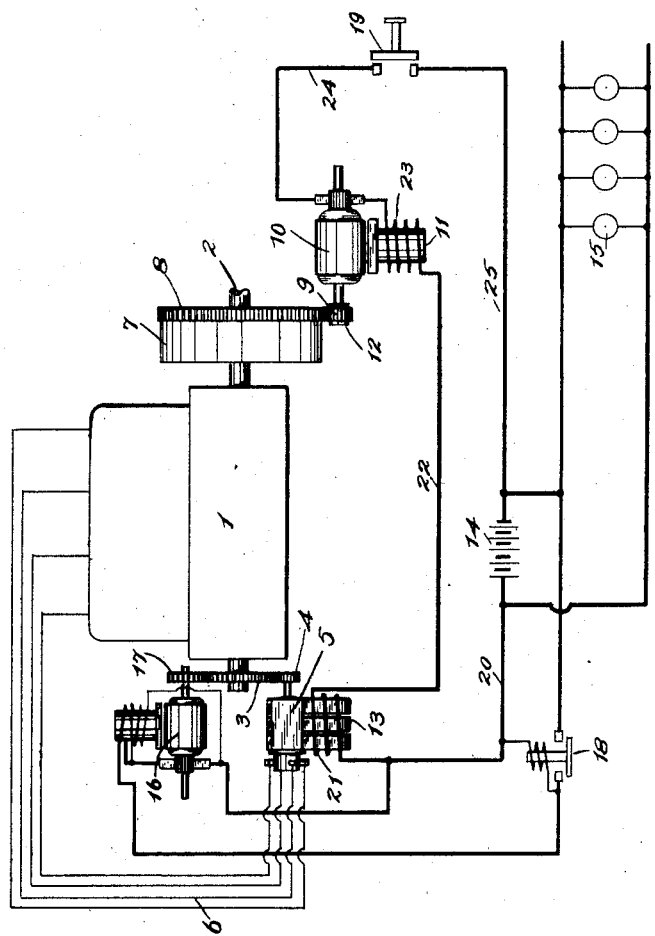
INVENTOR:

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC SYSTEM.

1,361,448. Specification of Letters Patent. Patented Dec. 7, 1920.

Application filed September 21, 1916. Serial No. 121,497.

*To all whom it may concern:*

Be it known that I, JOHN L. CREVELING, a citizen of the United States, residing in Tucson, State of Arizona, have invented certain new and useful Improvements in Electric Systems, of which the following is a description.

My invention pertains to that class of electric systems used in connection with prime movers which have some function which is not automatic at times and wherein it is desired to use a dynamo electric machine which may during certain intervals require augmentation of its normal magnetic strength, as well as insurance of correct magnetic polarity.

One type of system capable of employing my invention is, for example, one employing an internal combustion motor which is started from rest or placed in operation by means of an electric motor, and wherein the charge within the engine is ignited by a dynamo electric machine, such as the familiar magneto driven by the engine.

The drawing is a diagrammatic representation of one type of such system embodying the essentials of my invention.

In the drawing, 1 represents any suitable type of internal combustion engine provided with a main shaft 2 carrying a gear 3 which serves to drive the pinion 4 operating the ignition dynamo 5 which is connected as by suitable lead 6 with the various portions of the said engine where ignition sparks are required.

Any type of dynamo electric machine or magneto that is preferred may be used, and I have simply indicated what may be termed a high tension magneto of the self-contained variety provided with a distributer and all accessories necessary for proper distribution and timing of the sparks. As such devices are well known in the art, and articles of commerce, details are purposely omitted for sake of clearness.

The shaft 2 carries the usual fly-wheel 7 which is shown as provided with a gear 8 and meshed with the pinion 9 of a suitable starting motor having an armature 10 and series wound field magnet 11. Any suitable type of connection between the starting motor and the engine may be used, and, of course, it is desirable that this connection should be broken as soon as the engine is operating under its own motor power, unless driving the starting armature perform some useful function, as for example when the same is used as a generating armature for supplying current to the starting battery and lighting lamps or operating other translating devices.

In this particular embodiment chosen to illustrate one use of my invention, I have chosen to show an independent starting motor and any suitable type of over-running clutch or other device, as for example the well known Bendix drive may be considered as indicated at 12.

The dynamo electric machine 5, as stated, is preferably of the magneto type and provided with a permanent field magnet indicated at 13. 14 is a battery which may be used for operating the motor and maintaining lamps or other translating devices, as indicated at 15. I prefer to use a storage battery, and therefore provide automatic means for charging the same, which in this instance is indicated as an independent dynamo 16, permanently connected as by a pinion 17 with the gear 3. 18 is an automatic switch, such as well known in the art, for cutting the generator 16 into circuit with the storage battery when its voltage is slightly in excess of the battery, and cutting it out of circuit when its voltage is equal or very slightly below that of the battery, so as to prevent back discharge. 19 represents any suitable type of switch or starting device, the operation of which controls the motor 10 for starting the engine, by controlling the circuit composed of the positive lead 20, coil 21, main 22, coil 23, armature 10, main 24, switch 19 and negative lead 25. The coil 21 surrounds the field magnet of the ignition generator 5, in such manner that current flowing through the same from the storage battery influences the said magnet in such manner as to strengthen the normal magnetic field thereof. Coil 23 may be the usual type of series field winding for the starting motor 10.

An operation of my invention is substantially as follows:

If the engine 1 be at rest, the lamps or other translating devices 15 may be maintained by the battery 14 in an obvious manner. Switch 18 will be open and no current will be wasted by flowing back from the battery 14 through the charging generator. Switch 19 will be open and the motor 10 will be inoperative. If it be desired to start the engine 1, the circuit has simply to be made through the switch or other starting device indicated at 19, when current will flow from the battery 14 through wire 20, coil 21, wire 22, coil 23, armature of starting motor 10, wire 24, starting device 19, and wire 25 to the battery 14. This will cause the starting motor to operate and revolve the fly-wheel 7 through the instrumentality of gear 8 and pinion 9. This in turn will cause the ignition dynamo 5 to have its armature revolve through the instrumentality of gear 3 and pinion 4, and the starting current flowing through the coil 21 will strengthen the field magnet of the generator 5 in such manner as to cause the same to have sufficient difference of potential to properly operate the ignition devices even when revolving quite below its normal operating speed, and on this account the charge in the engine will be fired at lower starting speed than it would be if the coil 21 were omitted. As soon as the engine has started to operate under its own power, the starting motor will be automatically disengaged and its circuit may be opened at 19. When the engine is running at sufficient speed that the electromotive force of the charging generator 16 is in excess of that of the storage battery 14, the switch 18 will close and the said generator 16 will charge the battery 18 in a well known manner.

From the foregoing it will be noted that when the engine is being started the ignition dynamo will be operating under the maximum field excitation in a manner to be desired, and not only this but every time the engine is started up the permanent magnet of the ignition dynamo may be saturated in the proper direction in such manner as to keep it always in first class condition, even though its retentivity may not be all that should be desired.

I do not wish in any way to limit myself to the exact construction and details of operation given in this specification merely to portray one embodiment of my invention, as wide departure in details may be made without departing from the scope of my invention, which is as set forth in the following claim:

The combination with a prime mover, and ignition means therefor comprehending current generating means operated by said prime mover, of a storage battery, means operated thereby for starting the prime mover, means whereby said battery coöperates with the ignition generating means during operation of the starting means, a generator driven by the prime mover, and means whereby said generator charges the storage battery and may assist the same in affecting the ignition generator and whereby back discharge from the battery through said charging generator produces no effect upon the ignition generating means.

JOHN L. CREVELING.